United States Patent
Yamaai (10) Patent No.: US 7,873,239 B2
(45) Date of Patent: Jan. 18, 2011

(54) IMAGE PROCESSING APPARATUS, IMAGE DIRECTION DETERMINING METHOD, AND COMPUTER PROGRAM PRODUCT

(75) Inventor: Toshifumi Yamaai, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 991 days.

(21) Appl. No.: 11/713,011

(22) Filed: Mar. 2, 2007

(65) Prior Publication Data

US 2007/0217710 A1    Sep. 20, 2007

(30) Foreign Application Priority Data

Mar. 14, 2006 (JP) .............. 2006-068988
Sep. 1, 2006 (JP) .............. 2006-238016

(51) Int. Cl.
    *G06K 9/36* (2006.01)
(52) U.S. Cl. ................. 382/289; 714/700
(58) Field of Classification Search ......... 382/198, 382/289, 290, 292, 296; 702/179, 180, 181; 704/238, 240, E15.036; 714/700
See application file for complete search history.

(56) References Cited

U.S. PATENT DOCUMENTS

| | | | | |
|---|---|---|---|---|
| 5,761,328 A | * | 6/1998 | Solberg et al. ......... | 382/113 |
| 6,285,460 B1 | * | 9/2001 | Koh et al. ............ | 358/1.18 |
| 6,289,120 B1 | | 9/2001 | Yamaai et al. | |
| 6,785,420 B2 | | 8/2004 | Yamaai | |
| 7,003,159 B2 | | 2/2006 | Yamaai | |
| 7,151,859 B2 | | 12/2006 | Yamaai | |
| 2003/0152269 A1 | * | 8/2003 | Bourbakis et al. ...... | 382/187 |
| 2003/0152289 A1 | * | 8/2003 | Luo ................... | 382/289 |
| 2006/0018544 A1 | | 1/2006 | Ohguro | |
| 2006/0177151 A1 | | 8/2006 | Miyazawa et al. | |

FOREIGN PATENT DOCUMENTS

| | | |
|---|---|---|
| JP | 2000-113103 | 4/2000 |
| JP | 2006-031546 | 2/2006 |
| JP | 2006-260274 | 9/2006 |

* cited by examiner

*Primary Examiner*—Bhavesh M Mehta
*Assistant Examiner*—Gregory F Cunningham
(74) *Attorney, Agent, or Firm*—Dickstein Shapiro LLP (57) ABSTRACT

A first direction determining unit determines, with respect to each of directions in image data corresponding to an image that contains text, a degree of certainty that the direction corresponds to a predetermined direction of the image to obtain a first direction with the highest degree of certainty and a second direction with the second-highest degree of certainty. When the first direction is opposite to the second direction, a second direction determining unit determines whether the predetermined direction corresponds to the first direction or the second direction based on a position of a text line extracted from the image data.

15 Claims, 13 Drawing Sheets

| FIGURE NUMBER | COMPONENT NUMBER | COMPONENT NAME |
|---|---|---|
| 1 | 54462560 | CUSHION PAPER FEEDING TABLE |
| 2 | AO792943 | BRACKET HARNESS PAPER FEED |
| 3 | AO795504 | HARNESS PAPER FEED UNI RIGHT |
| 4 | AB013601 | GEAR 20T |
| 5 | 50530223 | BEARING 8 |
| 6 | 54201143 | STAT ELECTRIC WIRE LAYER |
| 7 | AB013602 | GEAR 40T |
| 8 | AO792830 | UPPER GUIDE PLATE CONVEYOR |
| 9 | AO792596 | SMALL GUIDE PLATE CONVEYOR |
| 10 | AO792835 | SMALL GUIDE CONVEYOR |
| 11 | AF020232 | DRIVING CONVEYOR ROLLER |
| 12 | AF020234 | DRIVEN CONVEYOR ROLLER |
| 13 | AO792571 | ASSEMBLED UPPER-LEFT STATOR CONVEYOR |
| 14 | AO792845 | PRESSURE PLATE CONVEYOR |
| 15 | 54462799 | SPRING CONVEYOR ROLLER |

FIG. 5C

| | | |
|---|---|---|
| 16 | A0792842 | HOLDING PRESSURE CONVEYOR ROLLER |
| 17 | A0792883 | ASSEMBLED PULLEY-DRIVEN PAPER FEEDING UNIT |
| 18 | AA132111 | SPACER MARU 8 × MARU 12 × 0.5 |
| 19 | AA145166 | SELF AND ANOTHER DRIVING |
| 20 | AX210028 | CLUTCH-DRIVEN FOR PAPER SUPPLY |
| 21 | A0792581 | DRIVING GANGED BRACKET |
| 22 | AB013599 | GEAR 36T |
| 23 | AB030320 | ROLLER-DRIVEN PULLEY |
| 24 | A0792578 | ASSEMBLED GEAR IDLER FOR PAPER SUPPLY |
| 100 | 09514010W | SEMS SCREW THREAD WITH FLAT WASHER M4 × 10 |
| 101 | 04340080W | TAPPING SCREW 3 SISU M4 × 8 |
| 102 | 07200060E | E GAKUTOMERI 6 |
| 103 | 11050016 | NYLON CLIP 4N |
| 104 | 08053291 | BALL BEARING 8 MARU |
| 106 | 11050005 | NYLON CLIP 3N |
| 107 | 05740050E | TAPER-CONCAVE TOP-SET SCREW WITH HEXAGONAL HOLE M4 × 5 |
| 108 | 09514008W | SEMS SCREW THREAD WITH FLAT WASHER M4 × 8 |
| 109 | 11050328 | HARNESS CLUMP ES-0505 |

22-RIGHT VERTICAL CONVEYING UNIT II

FIG. 6A

| FIGURE NUMBER | COMPONENT NUMBER | COMPONENT NAME |
|---|---|---|
| 1 | 54462560 | CUSHION PAPER FEEDING TABLE |
| 2 | A0792943 | BRACKET HARNESS PAPER FEED |
| 3 | A0795504 | HARNESS PAPER FEED UNI RIGHT |
| 4 | AB013601 | GEAR 20T |
| 5 | 50530223 | BEARING 8 |
| 6 | 54201143 | STAT ELECTRIC WIRE LAYER |
| 7 | AB013602 | GEAR 40T |
| 8 | A0792830 | UPPER GUIDE PLATE CONVEYOR |
| 9 | A0792596 | SMALL GUIDE PLATE CONVEYOR |
| 10 | A0792835 | SMALL GUIDE CONVEYOR |
| 11 | AF020232 | DRIVING CONVEYOR ROLLER |

FIG. 6

| FIG. 6A |
|---|
| FIG. 6B |

FIG. 6B

| 12 | AF020234 | DRIVEN CONVEYOR ROLLER |
| 13 | AO792571 | ASSEMBLED UPPER-LEFT STATOR CONVEYOR |
| 14 | AO792845 | PRESSURE PLATE CONVEYOR |
| 15 | 54462799 | SPRING CONVEYOR ROLLER |
| 16 | AO792842 | HOLDING PRESSURE CONVEYOR ROLLER |
| 17 | AO792883 | ASSEMBLED PULLEY-DRIVEN PAPER FEEDING UNIT |
| 18 | AA132111 | SPACER MARU 8 × MARU 12 × 0.5 |
| 19 | AA145166 | SELF AND ANOTHER DRIVING |
| 20 | AX210028 | CLUTCH-DRIVEN FOR PAPER SUPPLY |
| 21 | AO792581 | DRIVING GANGED BRACKET |
| 22 | AB013599 | GEAR 36T |
| 23 | AB030320 | ROLLER-DRIVEN PULLEY |
| 24 | AO792578 | ASSEMBLED GEAR IDLER FOR PAPER SUPPLY |

| FIG. 8A | FIG. 8B |

FIG. 8A

| FIGURE NUMBER | COMPONENT NUMBER | COMPONENT NUMBER |
|---|---|---|
| 1 | 54462560 | CUSHION PAPER FEEDING TABLE |
| 2 | A0792943 | BRACKET HARNESS PAPER FEED |
| 3 | A0795504 | HARNESS PAPER FEED UNI RIGHT |
| 4 | AB013601 | GEAR 20T |
| 5 | 50530223 | BEARING 8 |
| 6 | 54201143 | STAT ELECTRIC WIRE LAYER |
| 7 | AB013602 | GEAR 40T |
| 8 | A0792830 | UPPER GUIDE PLATE CONVEYOR |
| 9 | A0792596 | SMALL GUIDE PLATE CONVEYOR |
| 10 | A0792835 | SMALL GUIDE CONVEYOR |
| 11 | AF020232 | DRIVING CONVEYOR ROLLER |

FIG. 8B

| 12 | AF020234 | DRIVEN CONVEYOR ROLLER |
| 13 | AO792571 | ASSEMBLED UPPER-LEFT STATOR CONVEYOR |
| 14 | AO792845 | PRESSURE PLATE CONVEYOR |
| 15 | 54462799 | SPRING CONVEYOR ROLLER |
| 16 | AO792842 | HOLDING PRESSURE CONVEYOR ROLLER |
| 17 | AO792883 | ASSEMBLED PULLEY-DRIVEN PAPER FEEDING UNIT |
| 18 | AA132111 | SPACER MARU 8 × MARU 12 × 0.5 |
| 19 | AA145166 | SELF AND ANOTHER DRIVING |
| 20 | AX210028 | CLUTCH-DRIVEN FOR PAPER SUPPLY |
| 21 | AO792581 | DRIVING GANGED BRACKET |
| 22 | AB013599 | GEAR 36T |
| 23 | AB030320 | ROLLER-DRIVEN PULLEY |
| 24 | AO792578 | ASSEMBLED GEAR IDLER FOR PAPER SUPPLY |

IMAGE PROCESSING APPARATUS, IMAGE DIRECTION DETERMINING METHOD, AND COMPUTER PROGRAM PRODUCT

CROSS-REFERENCE TO RELATED APPLICATION

The present document incorporates by reference the entire contents of Japanese priority document, 2006-068988 filed in Japan on Mar. 14, 2006 and Japanese priority document, 2006-238016 filed in Japan on Sep. 1, 2006.

BACKGROUND OF THE INVENTION

1. Field of the Invention

The present invention relates to an image processing apparatus, an image direction determining method, and a computer program product.

2. Description of the Related Art

In a technology that has been generally known for determining the direction of an image, a character is extracted from the image, and its feature amount is then extracted. Then, a degree of similarity between the character and each of characters in four directions in a dictionary is found. Then, a direction with the highest degree of similarity is determined as the direction of the image. In such a technology, the degrees of similarity of the character for determining the direction in all of the four directions are added together to determine the direction. Therefore, for example, as in the case of "6" and "9", when the character has a high degree of similarity to a character in an opposite direction, the direction of the document image may be erroneously determined because the degrees of similarity are accumulated together.

To solve such a problem, Japanese Patent Application Laid-Open No. 2000-113103 discloses a technology in which a text area is extracted from image data, and character recognition is performed in four directions for each character. Then, a degree of similarity in character recognition is obtained in each direction, only degrees of similarity exceeding a predefined threshold are added up, and a direction with the highest degree of similarity is determined as the direction of an image.

However, if the conventional technology is used to perform character recognition on extracted characters in four directions, a high load is imposed on a central processing unit (CPU). For this reason, in an imaging device, such as a scanner, copier, or digital camera, installed with only a CPU with low specifications compared with a personal computer (PC), when an Optical Character Recognition (OCR) process is performed, the processing speed is impractically low.

To increase the processing speed, a technology has been proposed in which, based on layout information of text lines in image data, the direction of an image is determined. In the conventional technology, when four directions, i.e., up, down, right, and left, are determined, whether the direction of the image is a vertical direction or a horizontal direction can be correctly determined. However, a determination as to whether the direction of the image determined as a vertical direction is an up direction or a down direction or a determination as to whether the direction of the image determined as a horizontal direction is a right direction or a left direction may be erroneously made because a difference in layout information is small.

SUMMARY OF THE INVENTION

It is an object of the present invention to at least partially solve the problems in the conventional technology.

According to an aspect of the present invention, an image processing apparatus includes a certainty measuring unit that measures, with respect to each of directions in image data corresponding to an image that contains text, a degree of certainty that the direction corresponds to a predetermined direction of the image to obtain a first direction with highest degree of certainty and a second direction with second-highest degree of certainty, and a direction determining unit that extracts at least one text line from the image data, and determines, when the first direction is opposite to the second direction, whether one of the first direction and the second direction corresponds to the predetermined direction based on a position of the text line.

According to another aspect of the present invention, an image direction determining method includes extracting at least one text line from image data corresponding to an image that contains text, measuring, with respect to each of directions in the image data, a degree of certainty that the direction corresponds to a predetermined direction of the image to obtain a first direction with highest degree of certainty and a second direction with second-highest degree of certainty, and determining, when the first direction is opposite to the second direction, whether one of the first direction and the second direction corresponds to the predetermined direction based on a position of the text line.

According to still another aspect of the present invention, a computer program product comprising a computer usable medium having computer readable program codes embodied in the medium that, when executed, causes a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is not limited to the embodiments explained below.

Figure 1:
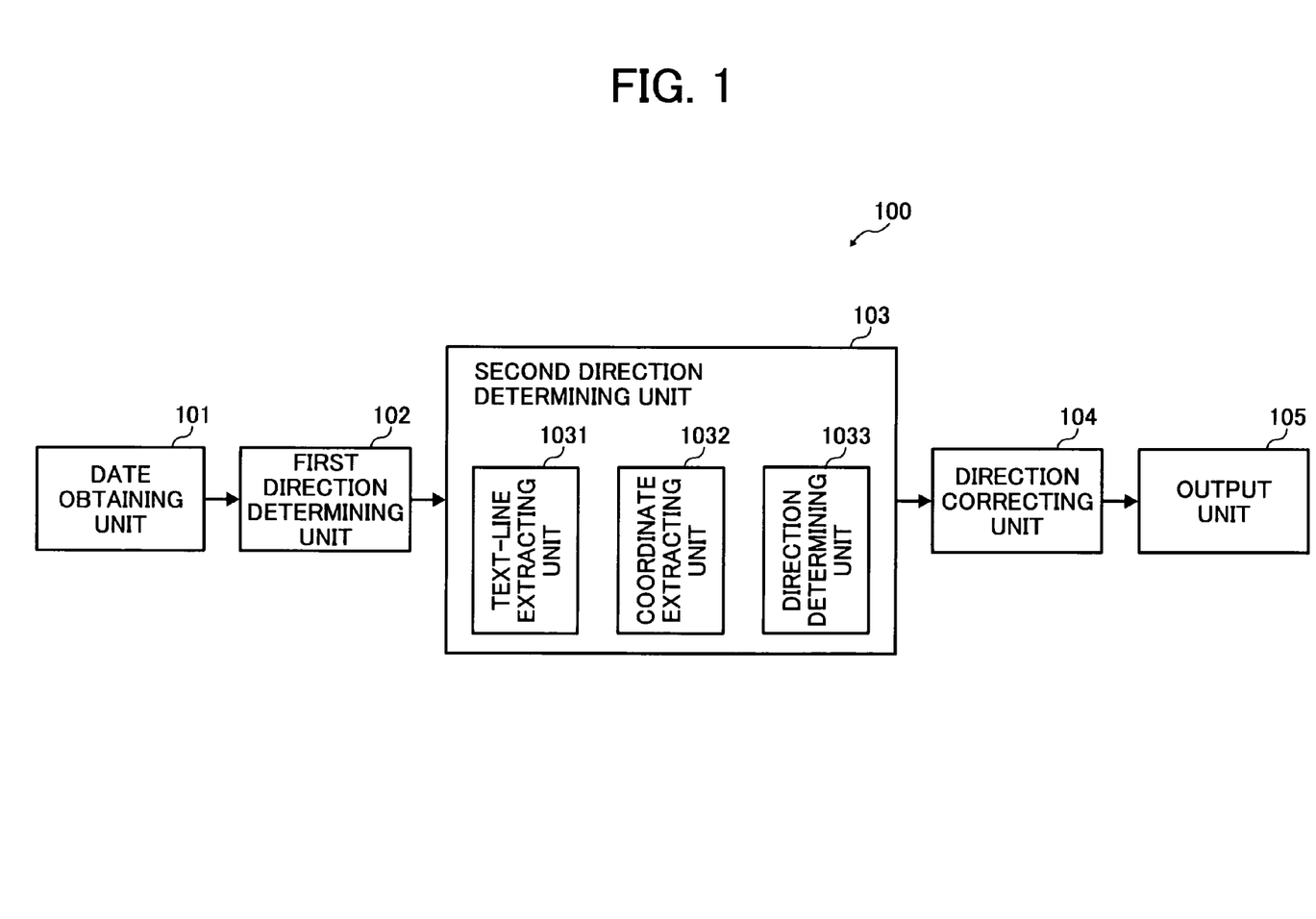
FIG. 1 is a block diagram of an image processing apparatus according to an embodiment of the present invention.

FIG. 1 is a block diagram of an image processing apparatus 100 according to an embodiment of the present invention. In the embodiments described below, the image processing apparatus 100 is explained as, for example, a PC. However, the image processing apparatus 100 can be configured to include a scanner that reads data from an original, or a database that stores therein the data. The image processing apparatus 100 can also be a printer or a Multifunction Product (MFP) that includes an image forming unit.

The image processing apparatus 100 includes a data obtaining unit 101, a first direction determining unit 102, a second direction determining unit 103, a direction correcting unit 104, and an output unit 105. For example, when a document is read with a scanner, image data of the document is generated by taking an arbitrary direction as an upper direction. Therefore, the actual upper direction of the document may be different from the upper direction of the generated image data. However, for displaying the image data on a screen, the image data has to be displayed in a direction in which characters are upright. Also, for printing the image data, the characters have to be printed in a predetermined direction. The image processing apparatus 100 corrects such an error in direction.

The data obtaining unit 101 obtains data read by a scanner or transmitted through a network. It is assumed herein that the read data is image data that contains a letter or a character (hereinafter, "document image data").

The first direction determining unit 102 determines a degree of certainty that each of up, down, right, and left directions of the document image data obtained by the data obtaining unit 101 is the upper direction of a document corresponding to the document image data. The direction of the document image data represents a direction of a character. For example, the up direction indicates that a character contained in the document image data tilts 0 degree, i.e., the character is upright. The left direction indicates that a character tilts 90 degrees, i.e., the character tilts to the left. The down direction indicates that a character tilts 180 degrees, i.e., the character is inverted. The right direction indicates that a character tilts 270 degrees, i.e., the character tilts to the right. The first direction determining unit 102 extracts a text line contained in the document image data as a vertical text line or a horizontal text line.

The second direction determining unit 103 determines a direction of document image data only limited directions, i.e., a direction in which the degree, of certainty determined by the first direction determining unit 102 is the highest (a direction with a first-ranked degree of certainty) and a direction in which the degree of certainty determined by the first direction determining unit 102 is the second highest (a direction with a second-ranked degree of certainty). The second direction determining unit 103 includes a text-line extracting unit 1031, a coordinate extracting unit 1032, and a direction determining unit 1033. The text-line extracting unit 1031 extracts a text line from the document image data with respect to each of vertical and horizontal text lines extracted from the first direction determining unit 102. The coordinate extracting unit 1032 finds coordinates of the head of the text line (hereinafter, "head coordinates") and coordinates of the end of the text line (hereinafter, "end coordinates") to create a histogram. The direction determining unit 1033 determines a direction of the document image data according to the degrees of distribution or dispersion of head coordinates (head-coordinate distribution) and that of end coordinates (end-coordinate distribution) of the text lines.

The direction correcting unit 104 rotates the document image data according to the direction of the document image data determined by the second direction determining unit 103 for correction. The output unit 105 prints or outputs on a screen the document image data corrected by the direction correcting unit 104.

Figure 2:
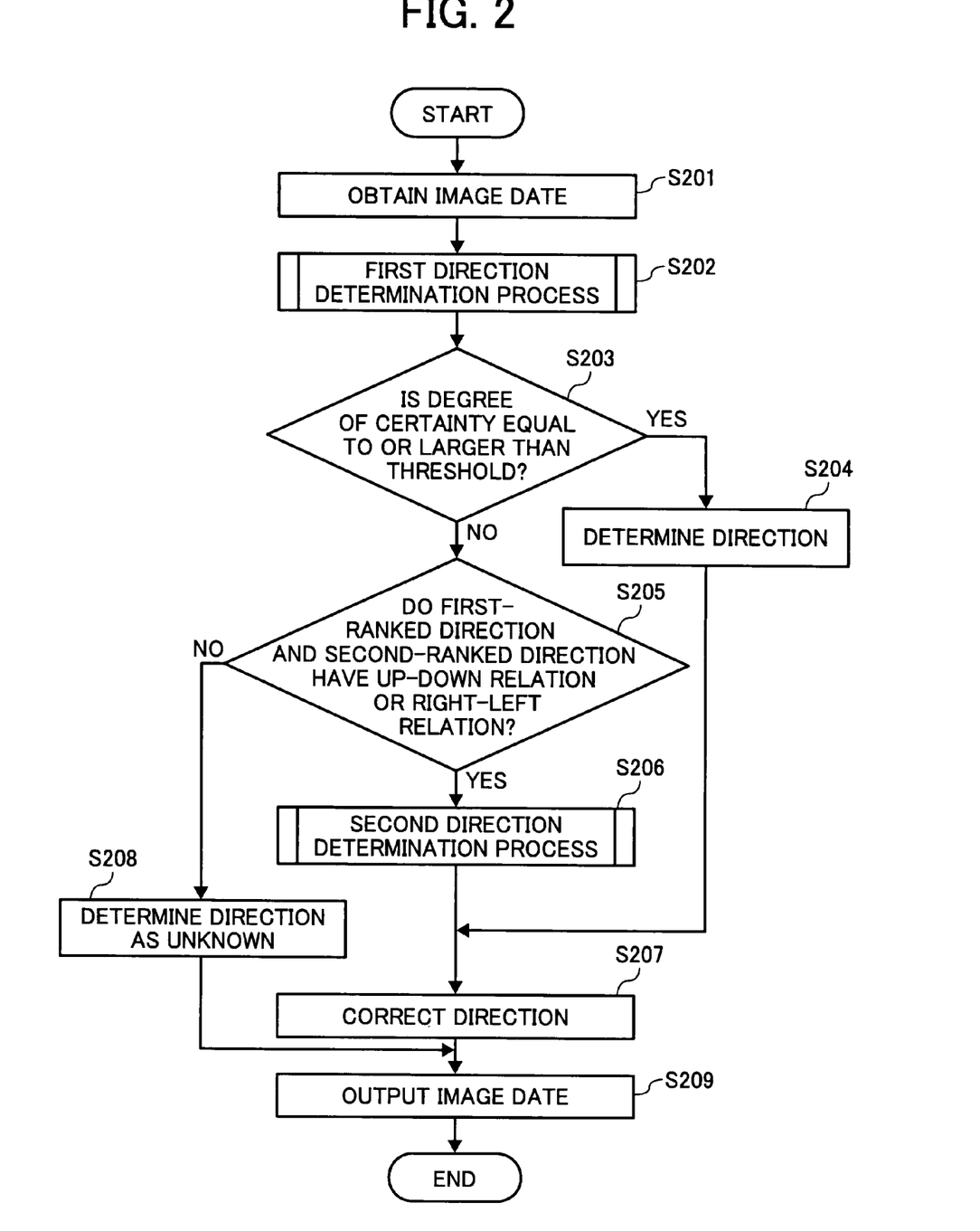
FIG. 2 is a flowchart of a direction determination and correction process performed by the image processing apparatus.

FIG. 2 is a flowchart of a direction determination and correction process performed by the image processing apparatus 100.

The data obtaining unit 101 obtains image data (step S201). The first direction determining unit 102 then determines the degree of certainty in each of the up, down, right, and left directions through a first direction determination process (step S202). Details of the first direction determination process are explained below. The second direction determining unit 103 then determines whether the degree of certainty of any one of the four directions, i.e., the up, down, right, and left directions, is equal to or larger than a threshold (step S203). If the degree of certainty of any one of the four directions is equal to or larger than the threshold (Yes at step S203), the second direction determining unit 103 determines the direction with the highest degree of certainty as a direction of the document image data (step S204).

If none of the degrees of certainty of the four directions is equal to or larger than the threshold (No at step S203), the second direction determining unit 103 then determines whether the first-ranked direction and the second-ranked direction have a relation of up and down directions or a relation of right and left directions (step S205).

If the first-ranked direction and the second-ranked direction have a relation of up and down directions or a relation of right and left directions (Yes at step S205), the second direction determining unit 103 determines one of the first-ranked direction and the second-ranked direction as a direction of the document image data through a second direction determination process (step S206). Details of the second direction determination process are explained below. The direction correcting unit 104 then rotates the image data according to the determined direction for correction (step S207). Incidentally, rotation and correction of the image data can be performed not only by rotating the coordinates of the image data for correction, but also by writing information related to a rotation angle of the image data in the header when the image data is in Portable Document Format (PDF). When the image data is in Exchangeable Image File Format (EXIF), the information related to the rotation angle of the image data can be written as additional information. For display and printing the image data, when a viewer and a printing program support PDF or EXIF, the image data can be displayed and printed through rotation without changing the coordinates of the image data.

If the first-ranked direction and the second-ranked direction do not have a relation of up and down directions or a relation of right and left directions (No at step S205), the second direction determining unit 103 determines that the direction of the document image data is unknown (step S208). The output unit 105 then outputs the image data to a screen or printer (step S209).

In this manner, if, in the first direction determination process, the degrees of certainty of the up, down, right, and left directions are not equal to or larger than the threshold, and therefore, the direction of the document image data cannot be determined or may be erroneously determined, the direction of the document image data is again determined in the second direction determination process, which is different from the first direction determination process, with limited two directions that are determined in the first direction determination process as highly possible directions of the document image data. With this, a correct direction of the document image data can be determined. Also, by limit the direction to be determined in the second direction determination process, the possibility of determining a correct direction is increased, and also the processing time is reduced. Furthermore, since the document image data is rotated according to the determined direction for correction, the document image data can be displayed on a screen in a direction in which the user can easily view, i.e., so that the characters are upright. Furthermore, also in printing, the document image data can be printed in a certain direction.

Figure 3:
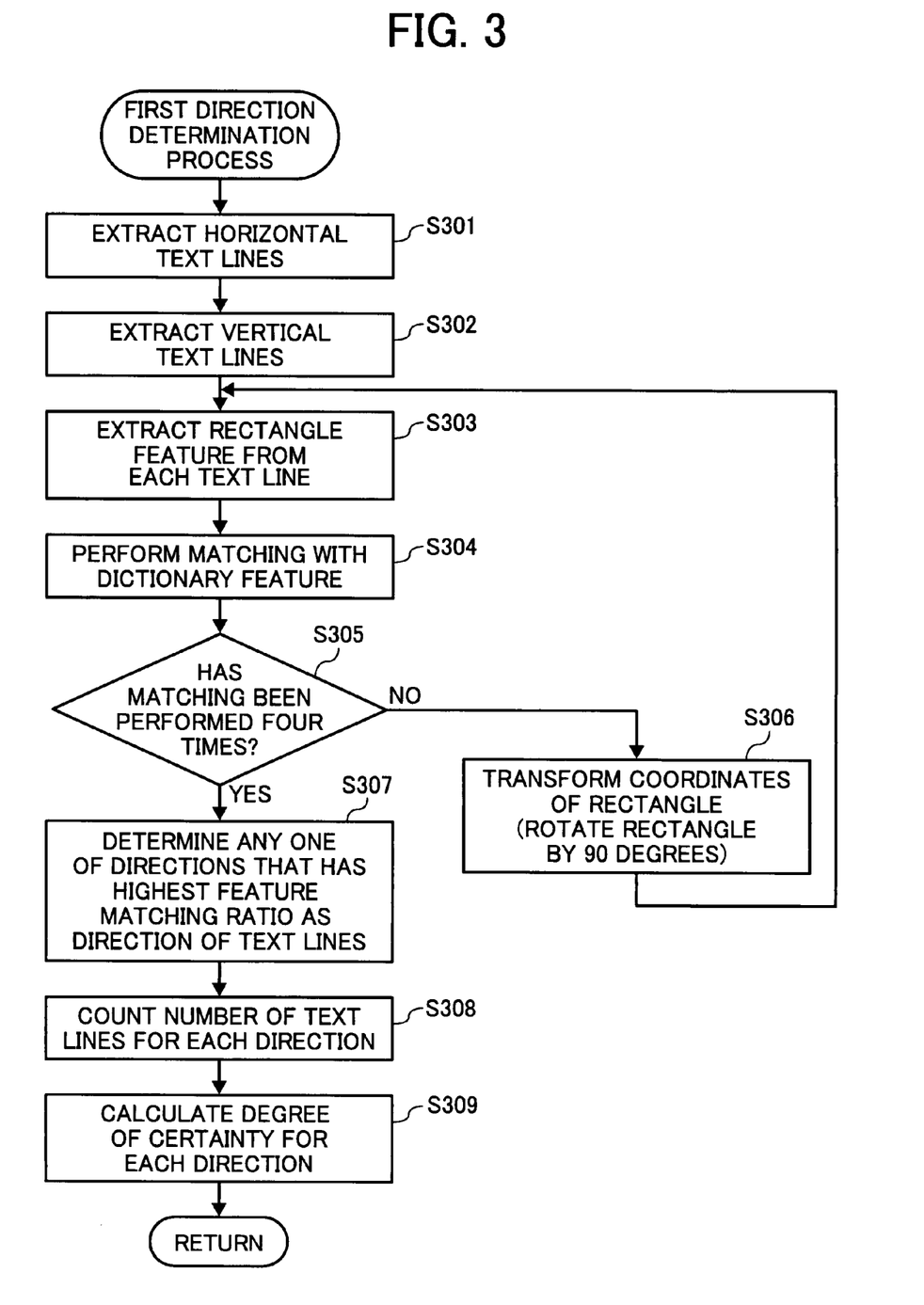
FIG. 3 is a detailed flowchart of a first direction determination process shown in FIG. 2.

FIG. 3 is a detailed flowchart of the first direction determination process performed by the first direction determining unit 102 (step S202 in FIG. 2). Here, the process procedure is briefly explained. For more detailed explanation, refer to Japanese Patent Application No. 2005-077879.

The first direction determining unit 102 extracts, from the image data, horizontal text lines (step S301). Next, the first direction determining unit 102 extracts, from the image data, vertical text lines (step S302). The first direction determining unit 102 extracts a rectangle feature from each of the text lines (step S303). The first direction determining unit 102 performs matching between the extracted rectangle feature and a feature written in a dictionary (step S304). The first direction determining unit 102 determines whether such matching has been performed four times for up, down, right, and left directions (step S305).

If matching has not been performed four times (No at step S305), the first direction determining unit 102 transforms the coordinates of the rectangle, i.e., rotates the rectangle by 90 degrees (step S306). If matching has been performed four times (Yes at step S305), the first direction determining unit 102 determines any one of the directions that has the highest feature matching ratio as the direction of the text lines (step S307). The first direction determining unit 102 then measures the number of text lines for each direction (step S308). The first direction determining unit 102 then calculates the degree of certainty of each direction from the number of text lines for each direction (step S309).

The first direction determination process is not to be restricted to the process explained herein. The degree of certainty for each direction can be found through another process. For example, a direction determination process with a speed higher than that of the process explained above is performed as the first direction determination process, thereby further reducing the processing speed as a whole.

Figure 4:
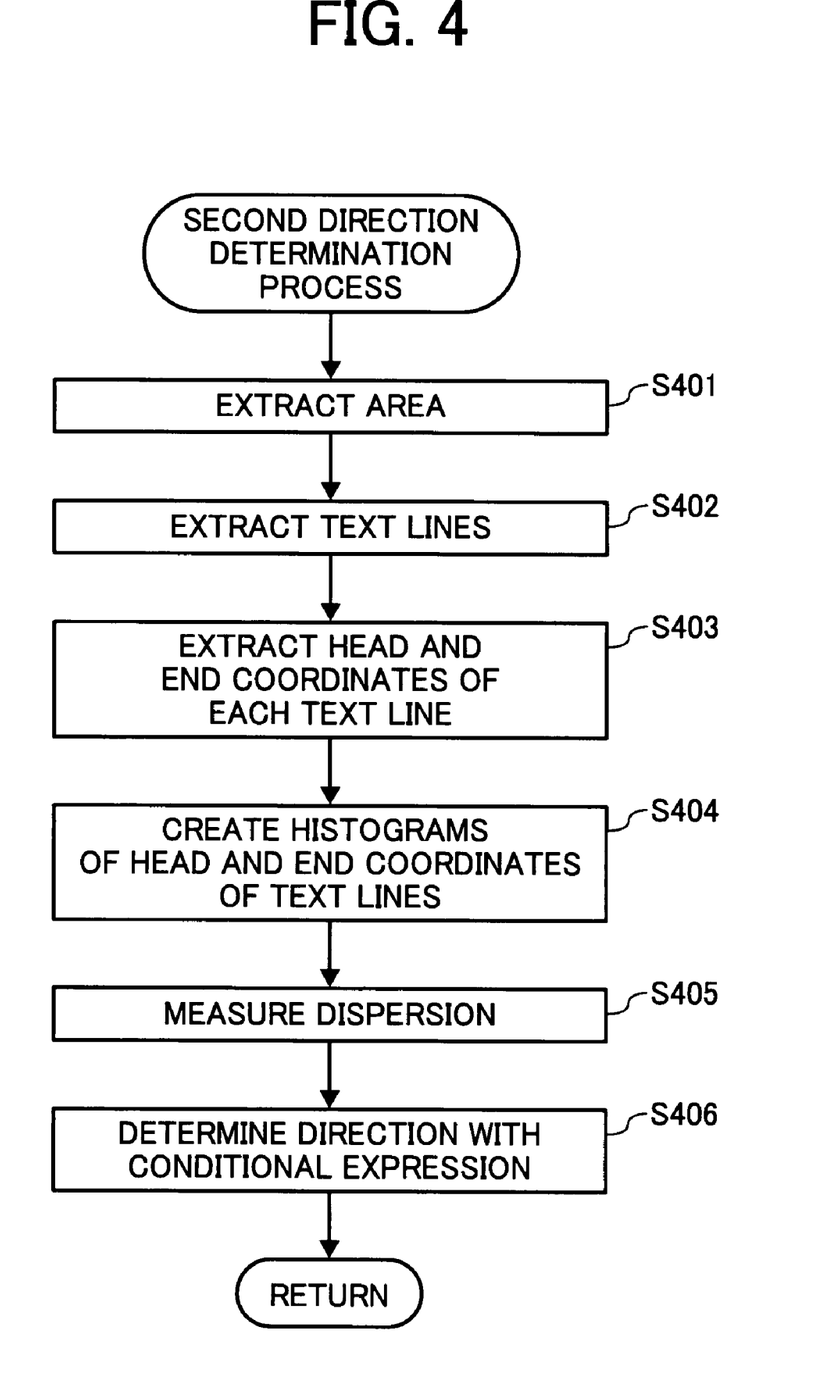
FIG. 4 is a detailed flowchart of a second direction determination process shown in FIG. 2.

FIG. 4 is a detailed flowchart of the second direction determination process performed by the second direction determining unit 103 (step S206 in FIG. 2).

Figure 5A:
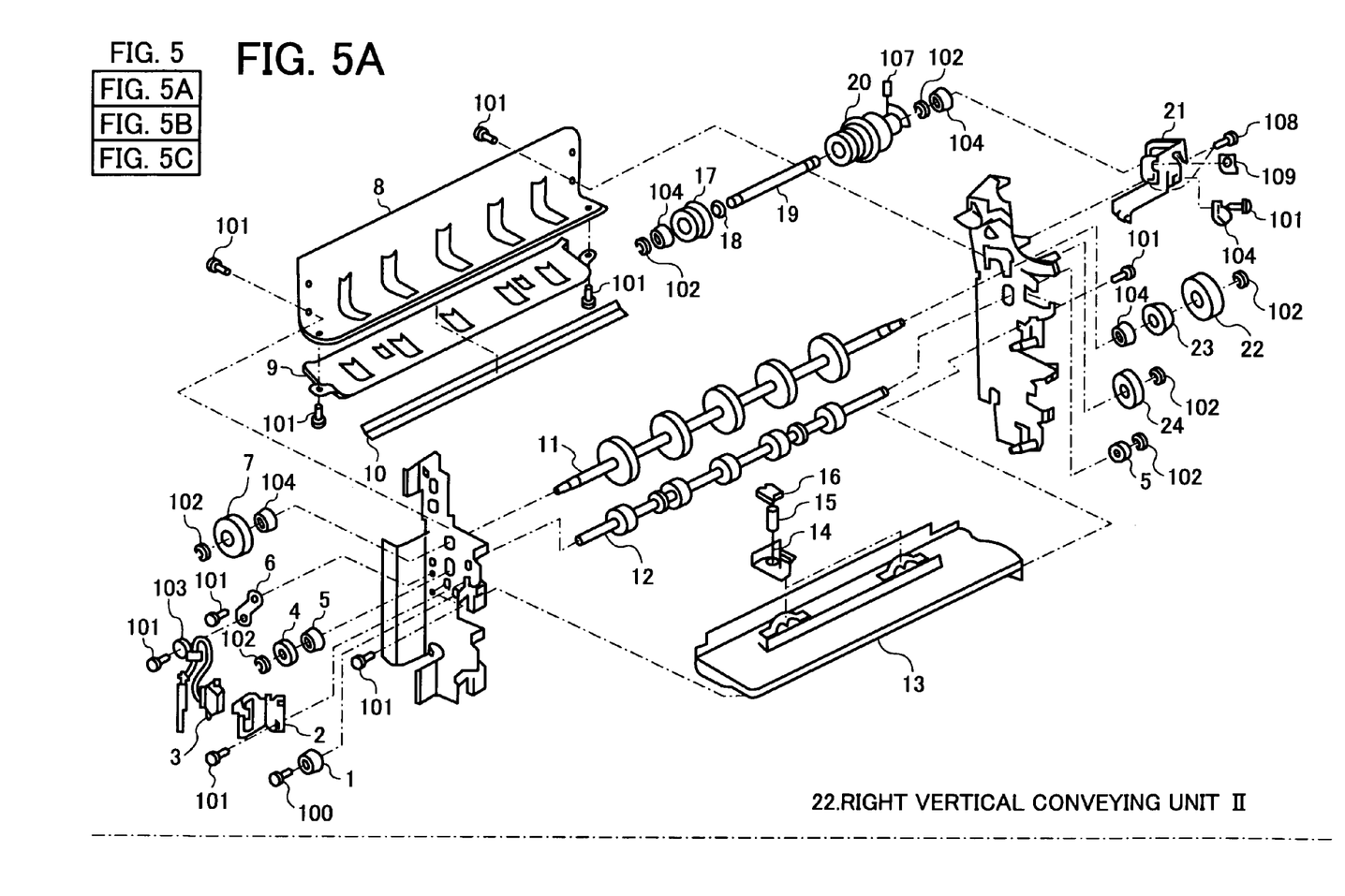
FIG. 5 is one example of image data for which the direction is to be determined.
Figure 5B:
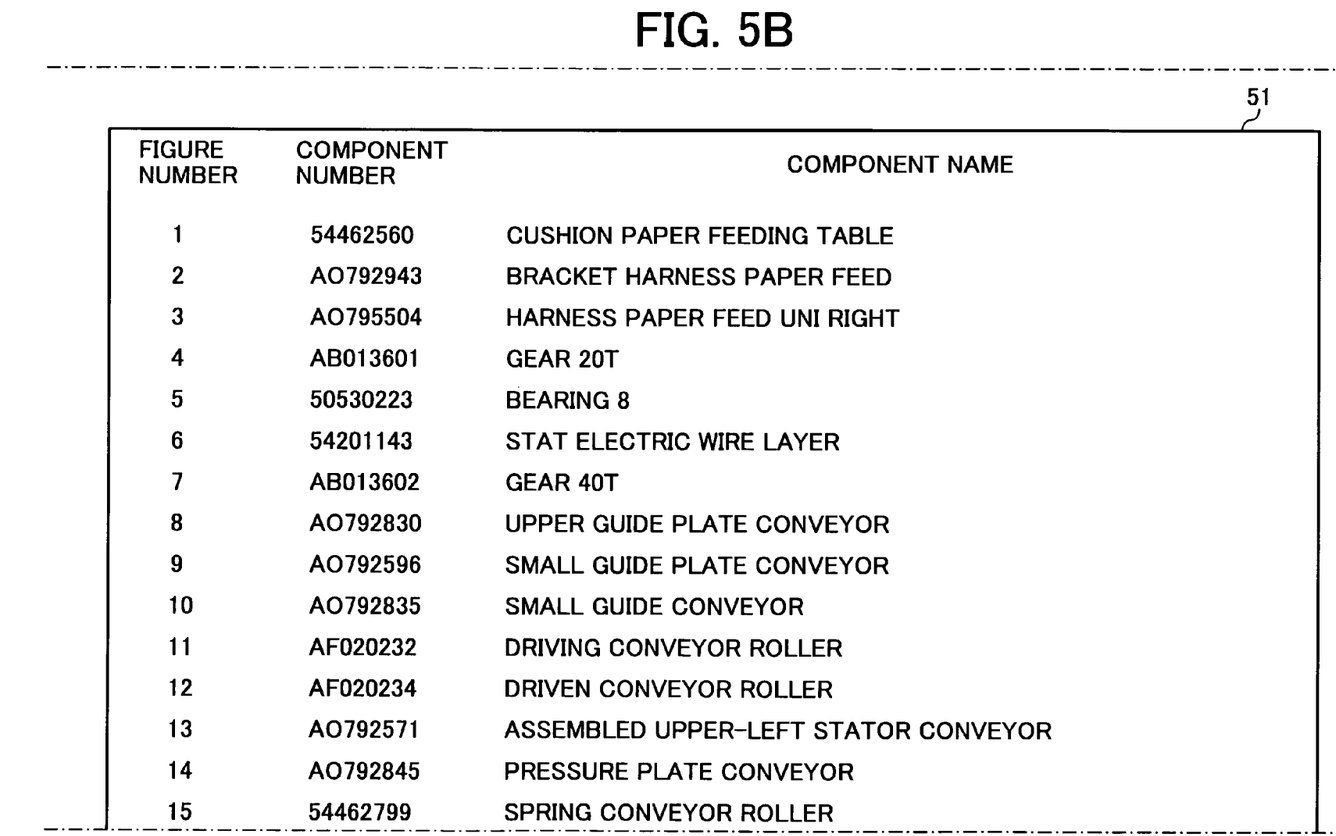
Figure 5C:
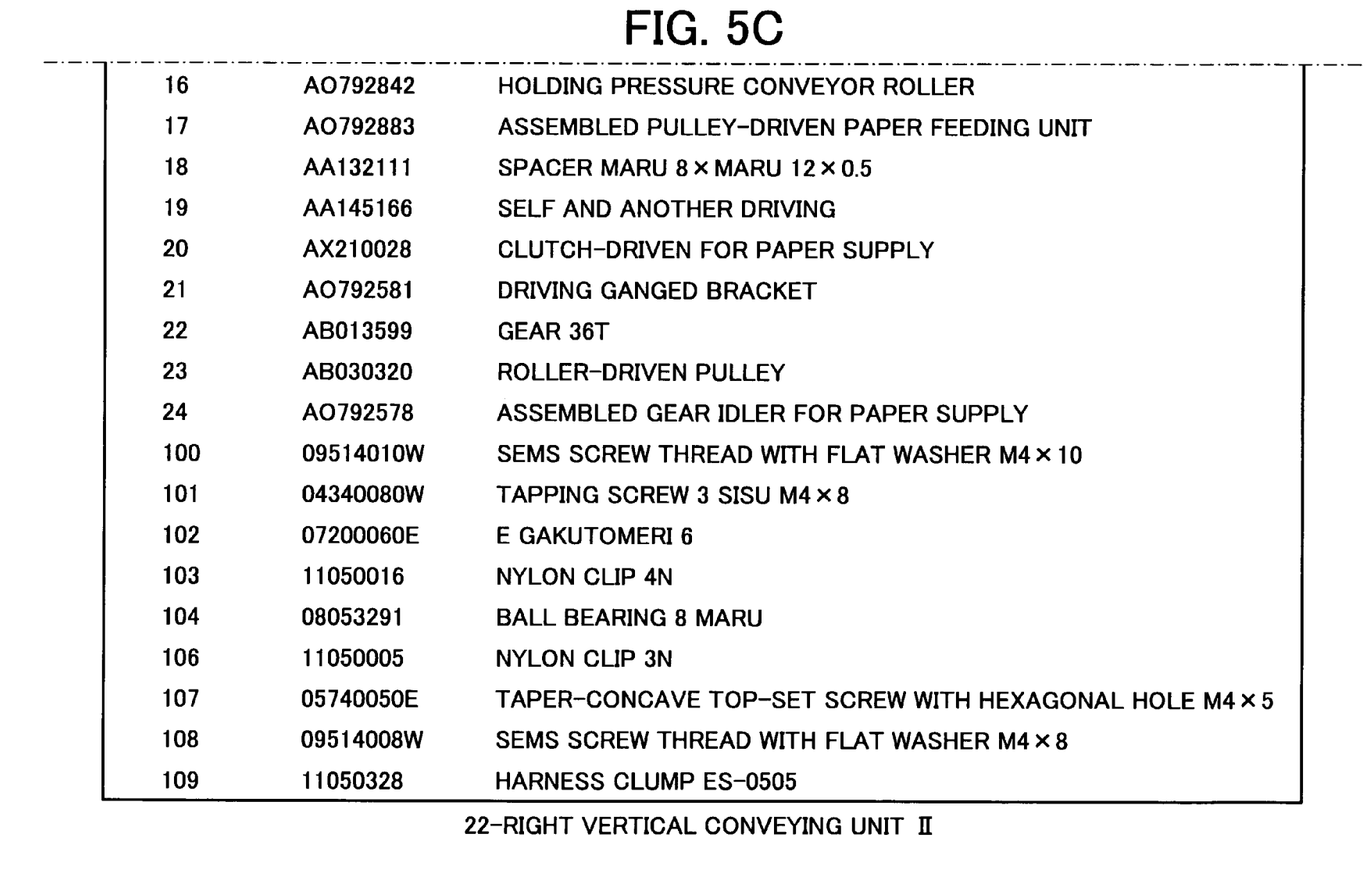

The text-line extracting unit 1031 extracts a determination area of the text lines (step S401). Specifically, when the first-ranked and second-ranked directions of the document image data with the first-ranked and second-ranked degrees of certainty determined by the first direction determining unit 102 are up and down directions, the direction of the document image data is provisionally regarded as the up direction for extracting an area. On the other hand, when the first-ranked and second-ranked directions of the document image data with the first-ranked and second-ranked degrees of certainty determined by the first direction determining unit 102 are right and left directions, the direction of the document image data is provisionally regarded as the left direction for extracting an area. FIG. 5 is one example of image data for which the direction is to be determined. For example, in FIG. 5, a rectangular area 51 surrounded by a dotted line is extracted as a rectangular area for extracting text lines.

Figure 6A:
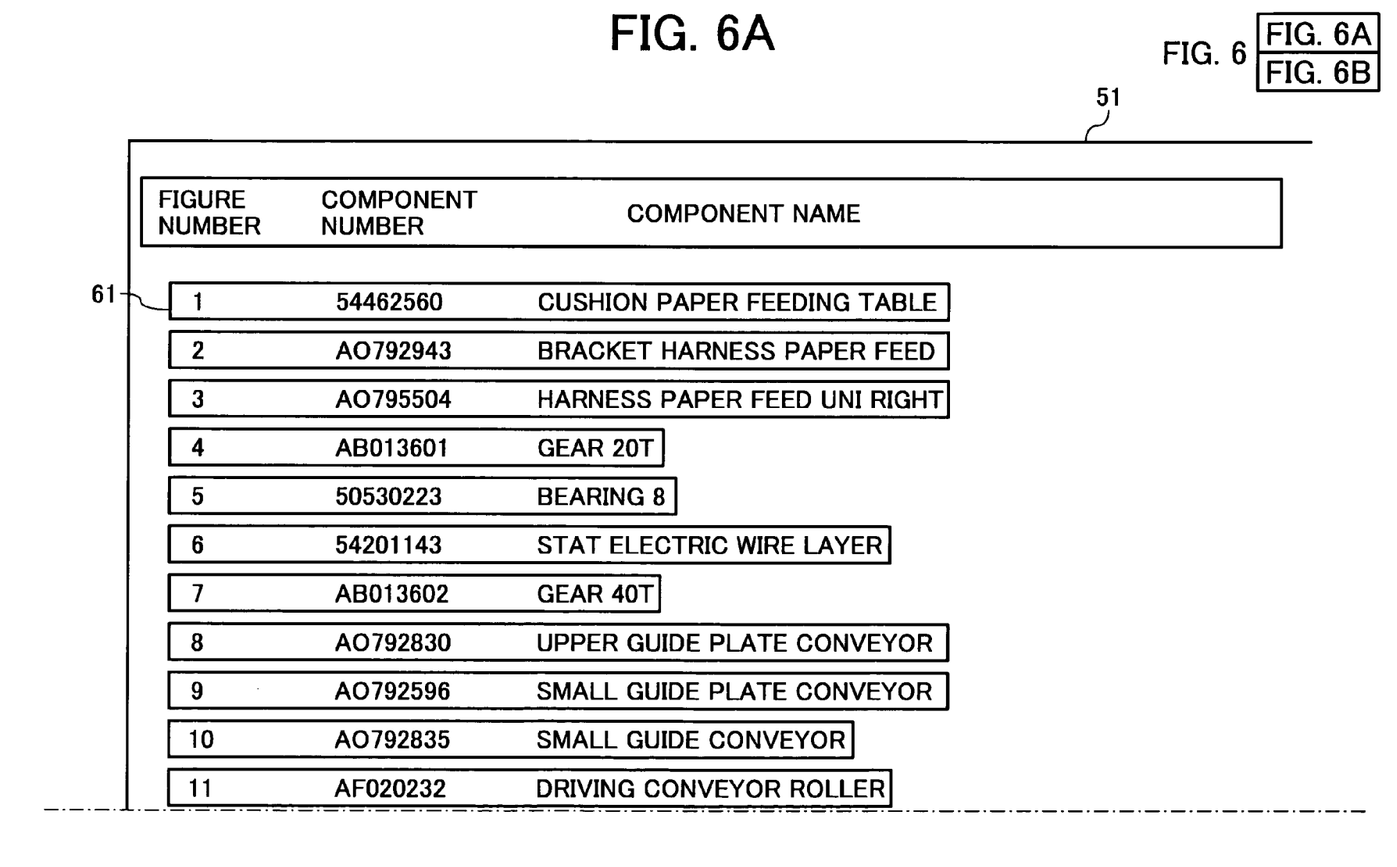
FIG. 6 is one example of text lines extracted from the image data shown in FIG. 5.
Figure 6B:
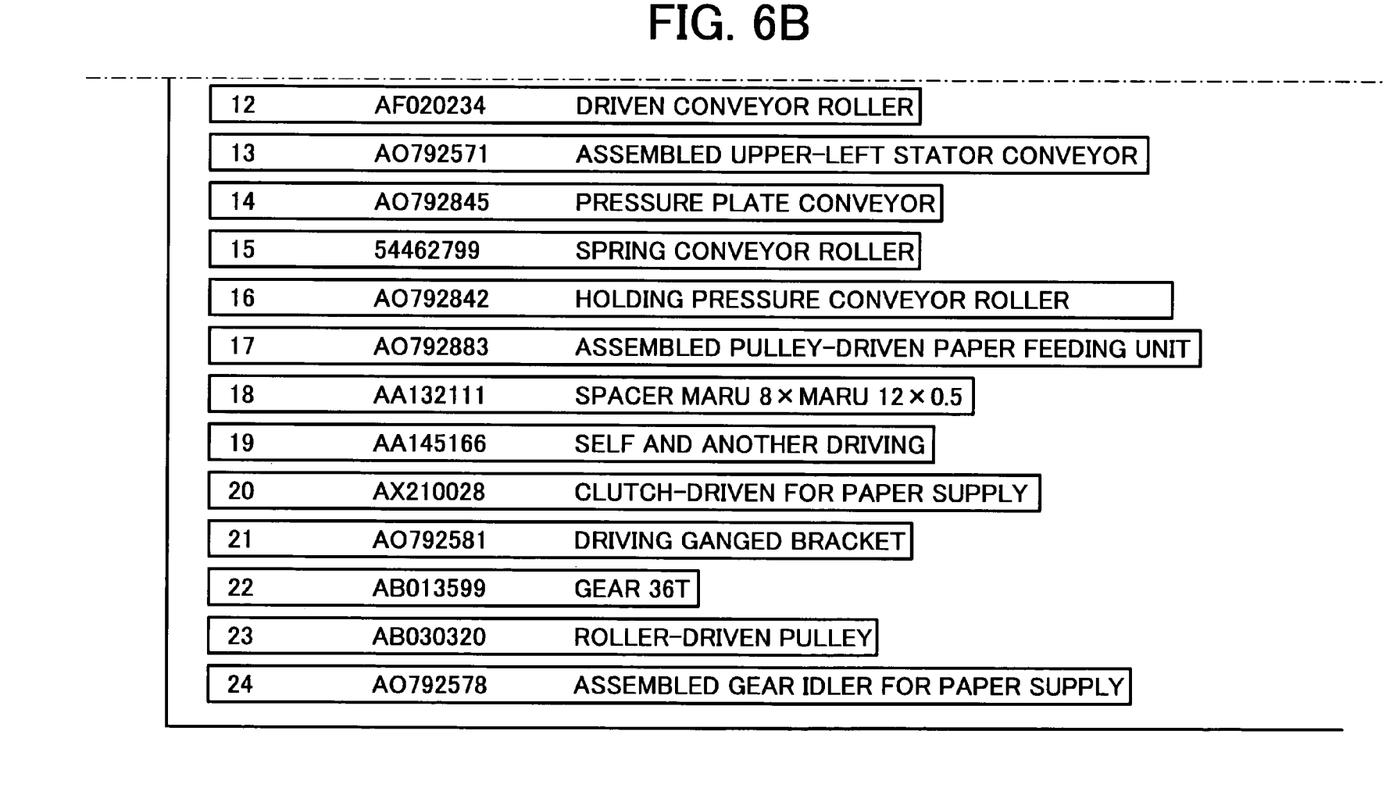

The text-line extracting unit 1031 extracts text lines from the extracted rectangular area 51 (step S402). FIG. 6 is one example of text lines extracted from the document image data shown in FIG. 5. This is an example in which the directions of the document image data with the first-ranked and second-ranked degrees of certainty determined by the first direction determining unit 102 are up and down directions and, based on the results of the first direction determination process, the text lines are extracted in a horizontal direction. Incidentally, when text lines are extracted, a tilt of the text lines can be found so that, in consideration of the found tilt, head and end coordinates can be found. The tilt of the text lines is found from a regression line of the end-coordinate distribution of the rectangle within the text lines. How to find a regression line is not explained herein because this is well known. Reference may be had to, for example, "Introductory Engineering Statistics" by I. Guttman and S. S. Wilks (Japanese translation has been published from Baifukan Co., Ltd.)

The coordinate extracting unit 1032 extracts the head and end coordinates of each extracted text line (step S403). In the example of in FIG. 6, an x coordinate of the head position (left side) of each text line and an x coordinate of the end position (right side) thereof are extracted. The direction determining unit 1033 creates histograms of the head and end coordinates of the text lines (step S404). In the example of in FIG. 6, a histogram of the x coordinates of the heads of the text lines and a histogram of the x coordinates of the ends thereof are created. The direction determining unit 1033 measures dispersion from the created histograms (step S405). Specifically, the head-coordinate distribution of the text lines and the end-coordinate distribution thereof are measured.

Here, the histogram indicating the starting points of the text lines has either one of the features: (1) the coordinates concentrate on the same value, and (2) the coordinates concentrate on two places, i.e., coordinates of an indentation (indentation position) and coordinates of the head of the document body. On the other hand, the histogram indicating the ending points of the text lines has either one of the features: (1) dispersion of the coordinates is large, and (2) the coordinates concentrate on the same value. Here, when both of the head and end coordinates concentrate on the respective same values, it can be thought that the number of text lines is large to some degree. Therefore, the first direction determining unit 102 can determine the directions with high degrees of certainty, and they exceed the threshold. Therefore, the difficulty in determination here does not pose a problem.

Next, using the features of the histograms explained above, the direction determining unit 1033 uses the measured dispersion values to determine the direction with a conditional expression (step S406). Specifically, the number of text lines not satisfying (average value of the head x coordinates of the text lines-dispersion value of the head x coordinates×2) and the number of text lines not satisfying (average value of the end x coordinates of the text lines-dispersion value of the end x coordinates×2) are counted, and the number counted larger is determined as the end of the text lines. In the example of FIG. 6, the end of the text lines (right side) has x coordinates dispersed more, and therefore more lines are counted. Therefore, the right side of the text lines is determined as an end. In this case, the characters are thought to be upright, and the direction of the image data is determined as an up direction.

In step S401, by extracting each paragraph as a determination area, histograms of the head coordinates of the first text line in the determination area and the end coordinates of the last text line can be found for determining the direction of the document image data. With this, even if the direction is different for each paragraph, the correct direction can be determined.

In another embodiment, instead of determining the starting points and the ending points of the text lines from dispersion of the head coordinates and the end coordinates of the text lines to determining the direction of the image data, a rectangular area including the extracted text lines is found, a distance from a boundary position of the rectangular area to the head of each text line and a distance from a boundary position thereof to the end of each text line are found and, based on dispersion of the distances, the direction of the image data is determined. Such a process is explained below.

Instead of the process explained above, the coordinate extracting unit 1032 of the second direction determining unit 103 finds a rectangular area including the extracted text lines, and then finds a distance from a boundary position of the rectangular area to the head of each text line and a distance from a boundary position thereof to the end of each text line. The coordinate extracting unit 1032 also finds a distance to the head of a plurality of text lines included in the rectangular area and a distance to the end thereof to create histograms. Instead of the process explained above, the direction determining unit 1033 determines the direction of the document image data according to the degree of dispersion of the distances from the rectangular area to the head of the text lines and the distances from the rectangular area to the end thereof.

Figure 7:
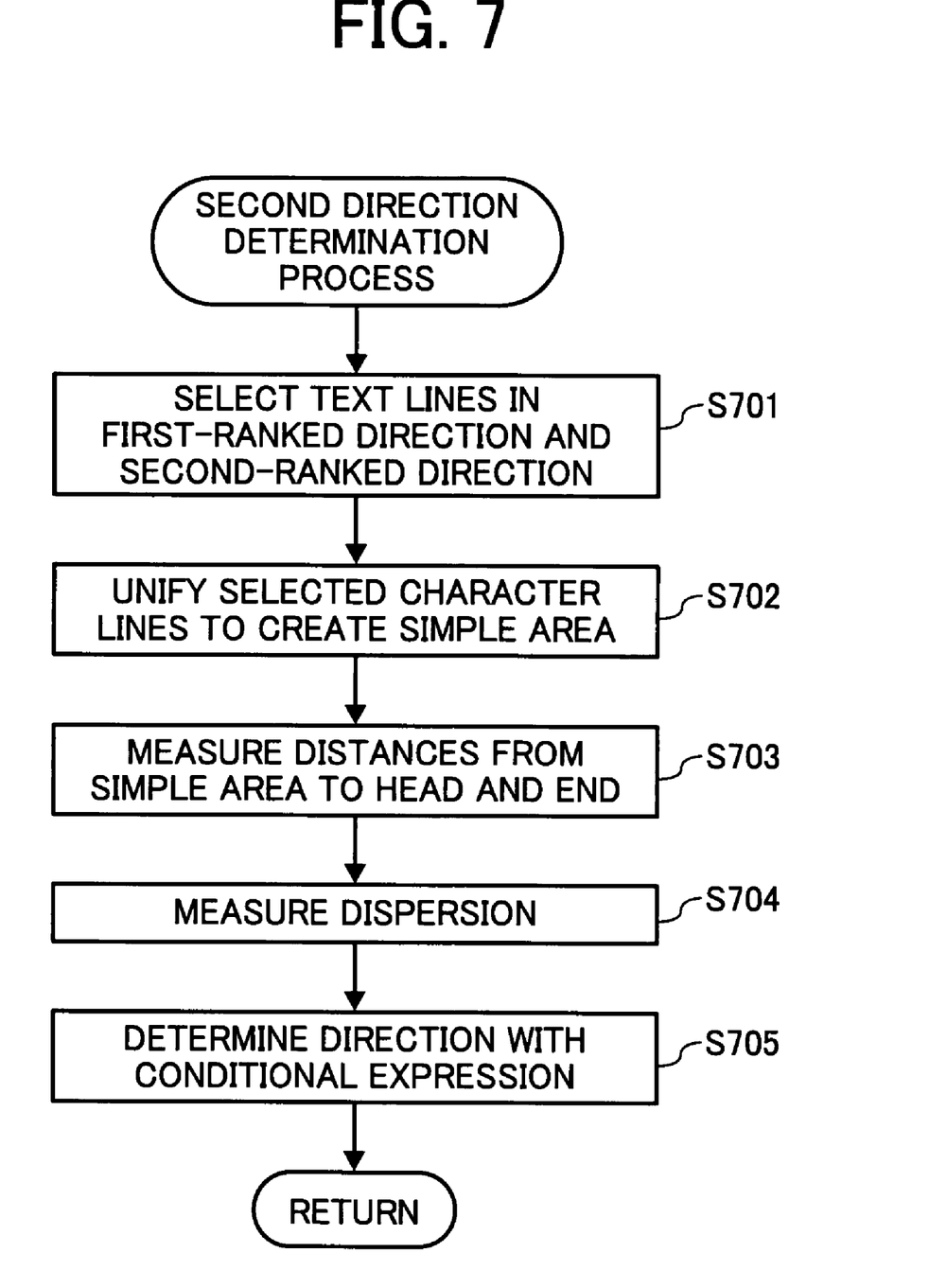
FIG. 7 is a flowchart of another direction determination process performed by a second direction determining unit shown in FIG. 1.

FIG. 7 is a flowchart of another direction determination process performed by the second direction determining unit 103. In the direction determination process described below, based on information about the text lines determined by the first direction determining unit 102, the direction of the document image data is determined.

Figures 8, 8A:
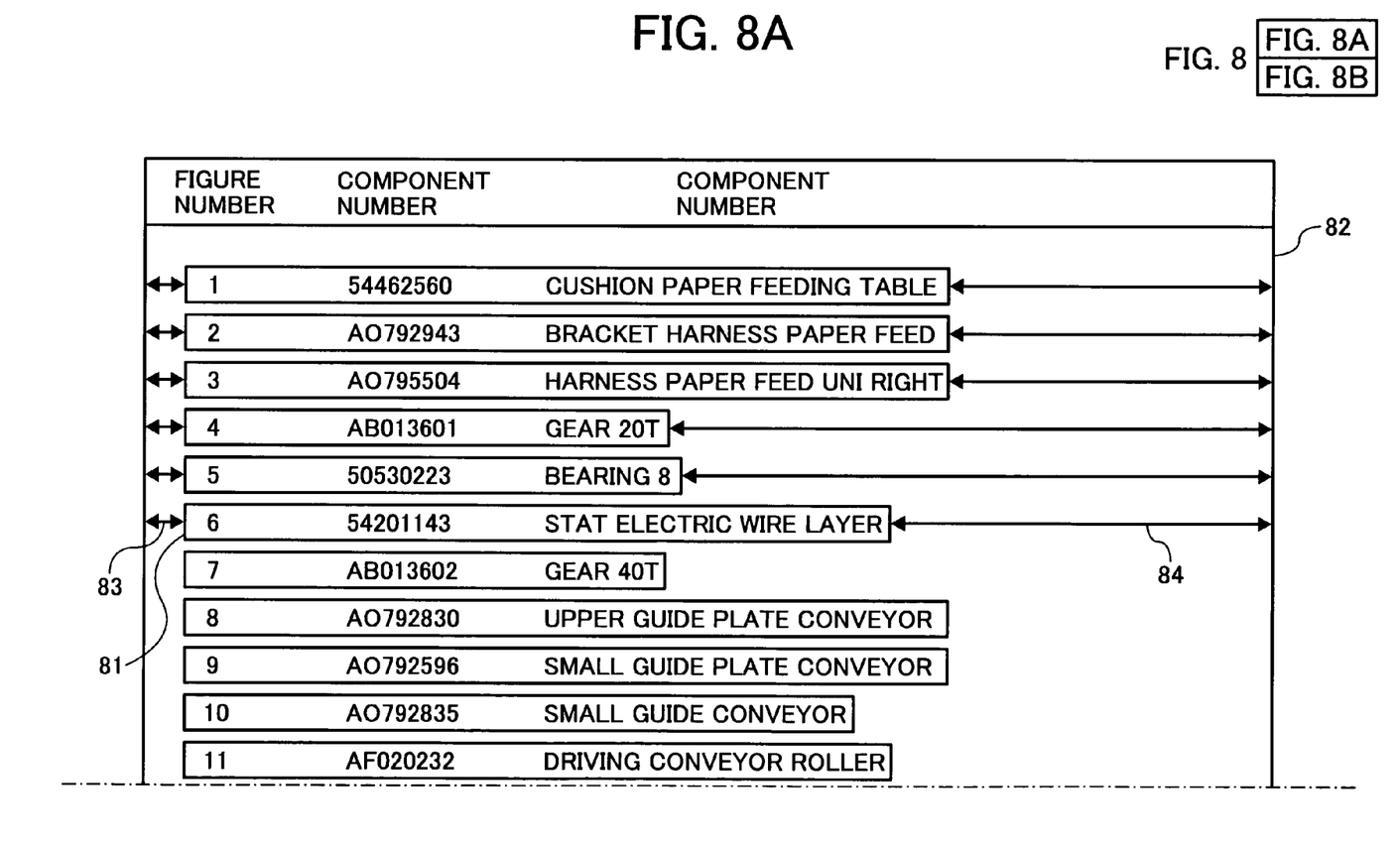
FIG. 8 is one example of text lines extracted to create a simple area.
Figure 8B:
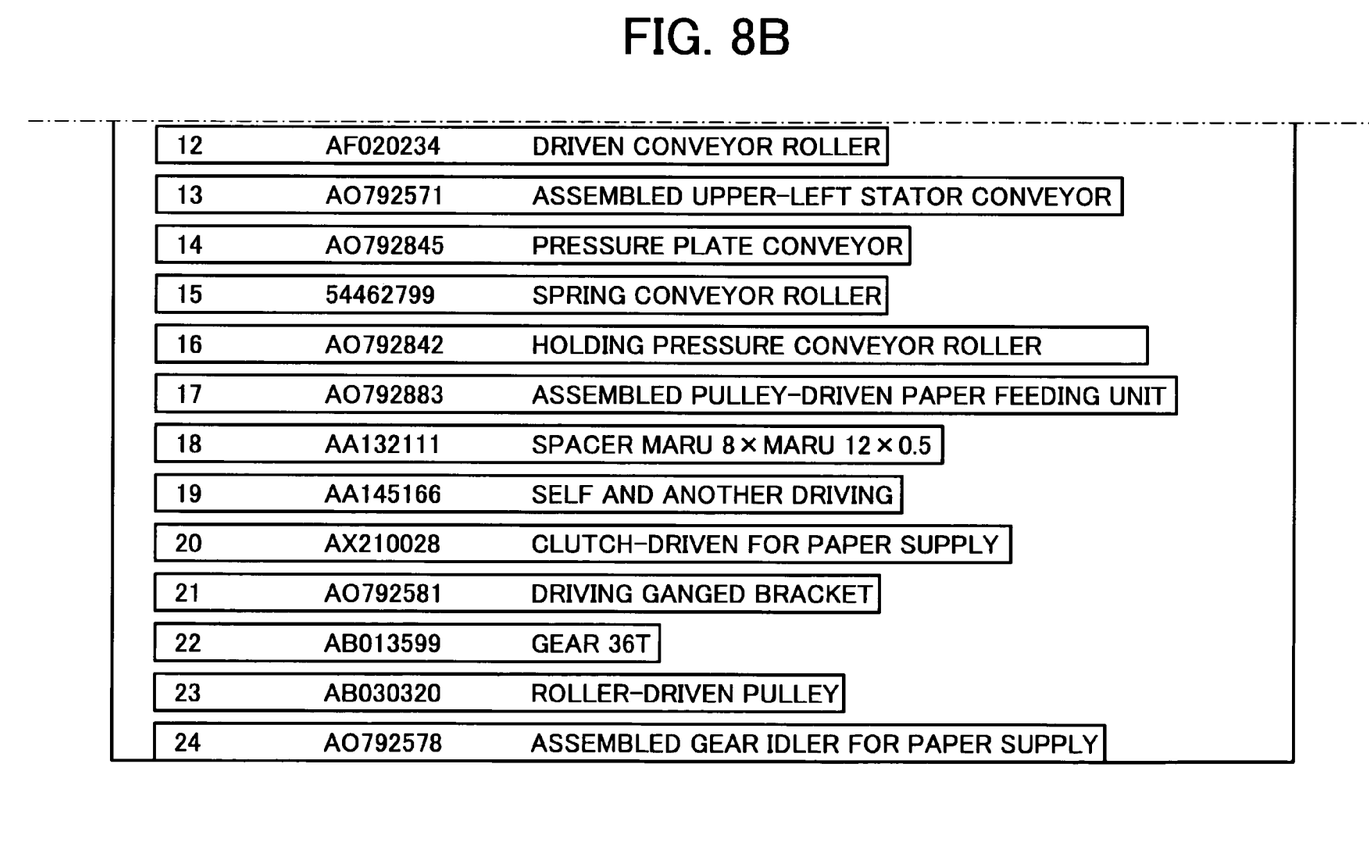

The text-line extracting unit 1031 selects text lines determined by the first direction determining unit 102 as those with the first-ranked degree of certainty and those with the second-ranked certainty (step S701). The text-line extracting unit 1031 unifies these selected text lines to create a simple area (step S702). FIG. 8 is one example of text lines extracted to create a simple area. In the example of in FIG. 8, the direction with the first-ranked degree of certainty and the direction with the second-ranked degree of certainty of the document image data are up and down directions, and a text line 81 and others extracted through the first direction determination process are unified to create a simple area 82. Incidentally, in the text lines with the first-ranked and second ranked degrees of certainty, by finding minimum x and y coordinates and maximum x and y coordinates, a rectangle defined by the minimum x and y coordinates and the maximum x and y coordinates can be taken as a determination area.

The coordinate extracting unit 1032 measures, for each text line, a distance from the simple area to the head (hereinafter, "head distance") and a distance from the simple area the end (hereinafter, "end distance") (step S703). In FIG. 8, in the text line 81, for example, a distance from the simple area 82 to the head of the text line 81 is a head distance 83. Also, a distance from the simple area 82 to the end of the text line 81 is an end distance 84. The direction determining unit 1033 measures dispersion of the head distances and dispersion of the end distances (step S704). Incidentally, in this case, histograms can be created to measure dispersion.

The direction determining unit 1033 determines the direction of the document image data with a conditional expression (step S705). There are features similar to those of the head coordinates and the end coordinates of the text lines explained above, and therefore, a conditional expression using these features are used to determine the direction of the document image data. Specifically, the number of text lines not satisfying (average value of the head distances-dispersion value of the head distances×2) and the number of text lines not satisfying (average value of the end distances-dispersion value of the end distances×2) are counted, and the number counted larger is determined as the end of the text lines. In the example of FIG. 8, the end of the text lines (right side) has end distances of the text lines dispersed more, and therefore more lines are counted. Therefore, the right side of the text lines is determined as an end. In this case, the characters are thought to be upright, and the direction of the image data is determined as an up direction.

In the embodiments explained above, the second direction determining unit 103 determines the head coordinates and the end coordinates of the text lines based on the text lines in the vertical direction or the horizontal direction extracted by the first direction determining unit 102. Alternatively, the text-line extracting unit 1031 of the second direction determining unit 103 can independently extract text lines in the vertical direction and the horizontal direction. In this case, the coordinate extracting unit 1032 finds head coordinates and end coordinates of text lines in the vertical direction and head coordinates and end coordinates of text lines in the horizontal direction, and then finds dispersion of each of four types of coordinates. Thus, the direction of the document image data is determined.

When a distance from the rectangular area to the head of each text line and a distance from the rectangular area to the end thereof are found, similarly, distances to the head and end of each text line in the vertical direction and distances to the head and end thereof in the horizontal direction are found. Thus, dispersion of each of four types of distances is found, and the direction of the document image data is determined.

Figure 9:
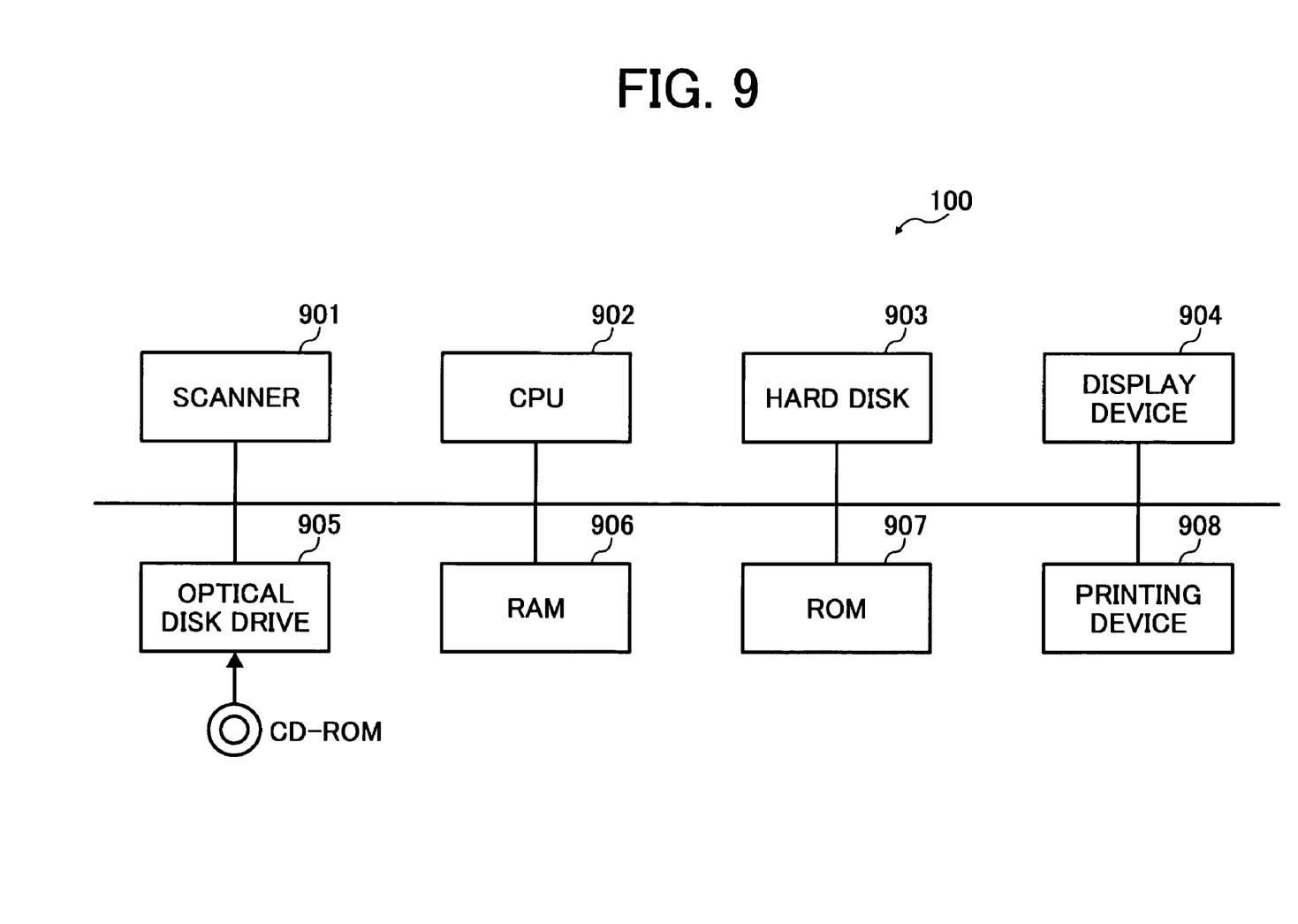
FIG. 9 is a block diagram of a hardware configuration of the image processing apparatus.

FIG. 9 is a block diagram of a hardware configuration of the image processing apparatus 100. In the hardware configuration shown in FIG. 9, the process according to the embodiment is performed through digital processing by a microprocessor or the like. In FIG. 9, the image processing apparatus 100 is a computer, such as a PC, and includes a scanner 901, a CPU 902, a hard disk 903, a display device 904, an optical disk drive 905, a random access memory (RAM) 906, a read-only memory (ROM) 907, and a printing device 908. The CPU 902 controls each component of the image processing apparatus 100. The ROM 907 stores therein a computer program for starting the CPU 902. The hard disk 903 stores therein image data read by the scanner 901, an operating system, an application program, and the like. The RAM 906 serves as a work area into which the image data stored in the hard disk 903 is loaded for a character direction identification process. The display device 904 displays image data, an input state, and the like. The printing device 908 prints image data. The optical disk drive 905 reads a computer program and the like stored in various optical information recording media, such as compact disk read-only memories (CD-ROMs). Data transmitted and received among these components is adjusted by a bus controller (not shown).

The scanner 901 optically reads an original, and converts the read results to image data, which is an electrical signal. The CPU 902 reads a direction determination program that implements the direction determination process stored in the ROM 907 or the hard disk 903, and performs image processing on document image data in the RAM 906 as a work area. The direction determination program can be read by the optical disk drive 905 from a storage medium, such as a CD-ROM or a flexible disk (FD). The processed image data is stored in the hard disk 903 under the control of the CPU 902 and, as required, displayed on the display device 904 and output by the printing device 908.

The image processing apparatus 100 stores in the hard disk 903 an image direction determination program as an application program. That is, the hard disk 903 stores therein the image direction determination program.

In general, an application program to be installed on the hard disk 903 is stored in a storage medium. Examples of the storage medium include various types of optical information recording media such CD-ROM and magnetic media such as FD. The application program stored in the storage medium is installed on the hard disk 903. That is, a portable storage medium, such as various types of optical information recording media including CD-ROM and magnetic media including FD, can be used to store the image direction determination program. The image direction determination program can also be, for example, downloaded from outside through a communication device (not shown), and installed on the hard disk 903.

As set forth hereinabove, according to an embodiment of the present invention, a certainty measuring unit measures, with respect to each of directions in image data corresponding to an image that contains text, a degree of certainty that the direction corresponds to a predetermined direction of the image, and obtains a first direction with highest degree of certainty and a second direction with second-highest degree of certainty. A direction determining unit extracts at least one text line from the image data, and determines, when the first direction is opposite to the second direction, whether one of the first direction and the second direction corresponds to the predetermined direction based on the text line. That is, the degree of certainty is determined with respect to each direction in the image data, and the direction of the image data is determined based on two directions. Thus, the direction of the image data can be determined accurately at high speed.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
    a certainty measuring unit that measures, with respect to each of directions in image data corresponding to an image that contains text, a degree of certainty that the direction corresponds to a predetermined direction of the image to obtain a first direction with highest degree of certainty and a second direction with second-highest degree of certainty;
    a direction determining unit that extracts at least one text line from the image data, and determines, when the first direction is opposite to the second direction, whether one of the first direction and the second direction corresponds to the predetermined direction based on a position of the text line; and
    a coordinate extracting unit that extracts head coordinates and end coordinates of the text line, and
    wherein the direction determining unit determines whether one of the first direction and the second direction corresponds to the predetermined direction based on the head coordinates and the end coordinates.

2. The image processing apparatus according to claim 1, wherein the direction determining unit determines whether the degree of certainty is equal to or larger than a threshold, and, upon determining that none of the degrees of certainty of all the directions is equal to or larger than the threshold, determines whether one of the first direction and the second direction corresponds to the predetermined direction.

3. The image processing apparatus according to claim 1, wherein the image data includes a plurality of text lines, the coordinate extracting unit extracts head coordinates and end coordinates of each of the text lines, and obtains head-coordinate distribution and end-coordinate distribution, and the direction determining unit determines whether one of the first direction and the second direction corresponds to the predetermined direction based on the head-coordinate distribution and the end-coordinate distribution.

4. An image processing apparatus comprising:
    a certainty measuring unit that measures, with respect to each of directions in image data corresponding to an image that contains text, a degree of certainty that the direction corresponds to a predetermined direction of the image to obtain a first direction with highest degree of certainty and a second direction with second-highest degree of certainty;
    a direction determining unit that extracts at least one text line from the image data, and determines, when the first direction is opposite to the second direction, whether one of the first direction and the second direction corresponds to the predetermined direction based on a position of the text line; and
    a coordinate extracting unit that measures first distances from a boundary of a rectangular area in the image data, the rectangular area including a plurality of text lines, to heads of the text lines and second distances from a boundary of the rectangular area to ends of the text lines, and
    wherein the direction determining unit determines whether one of the first direction and the second direction corresponds to the predetermined direction based on the first distances and the second distances.

5. The image processing apparatus according to claim 4, wherein the coordinate extracting unit obtains distribution of the first distances and distribution of the second distances, and the direction determining unit determines whether one of the first direction and the second direction corresponds to the predetermined direction based on the distribution of the first distances and the distribution of the second distances.

6. An image direction determining method comprising:
    extracting, using a CPU, at least one text line from image data corresponding to an image that contains text;
    measuring, using a CPU, with respect to each of directions in the image data, a degree of certainty that the direction corresponds to a predetermined direction of the image to obtain a first direction with highest degree of certainty and a second direction with second-highest degree of certainty;
    determining, using a CPU, when the first direction is opposite to the second direction, whether one of the first direction and the second direction corresponds to the predetermined direction based on a position of the text line; and
    obtaining, using a CPU, head coordinates and end coordinates of the text line, and
    wherein the determining includes determining whether one of the first direction and the second direction corresponds to the predetermined direction based on the head coordinates and the end coordinates.

7. The image direction determining method according to claim 6, wherein the determining includes determining whether the degree of certainty is equal to or larger than a threshold, and, when none of the degrees of certainty of all the directions is equal to or larger than the threshold with respect to all the directions, determining whether one of the first direction and the second direction corresponds to the predetermined direction.

8. The image direction determining method according to claim 6, wherein the extracting includes extracting a plurality of text lines, the obtaining includes obtaining head coordinates and end coordinates of each of the text lines, and obtaining head-coordinate distribution and end-coordinate distribution, and the determining includes determining whether one of the first direction and the second direction corresponds to the predetermined direction based on the head-coordinate distribution and the end-coordinate distribution.

9. An image direction determining method comprising:
extracting, using a CPU, at least one text line from image data corresponding to an image that contains text;
measuring, using a CPU, with respect to each of directions in the image data, a degree of certainty that the direction corresponds to a predetermined direction of the image to obtain a first direction with highest degree of certainty and a second direction with second-highest degree of certainty;
determining, using a CPU, when the first direction is opposite to the second direction, whether one of the first direction and the second direction corresponds to the predetermined direction based on a position of the text line, and wherein the extracting includes extracting a rectangular area that includes a plurality of text lines from the image data;
measuring, using a CPU, first distances from a boundary of the rectangular area to heads of the text lines; and
measuring, using a CPU, second distances from a boundary of the rectangular area to ends of the text lines, and
wherein the determining includes determining whether one of the first direction and the second direction corresponds to the predetermined direction based on the first distances and the second distances.

10. The image direction determining method according to claim 9, wherein the measuring first distances includes obtaining distribution of the first distances, the measuring second distances includes obtaining distribution of the second distances, and the determining includes determining whether one of the first direction and the second direction corresponds to the predetermined direction based on the distribution of the first distances and the distribution of the second distances.

11. A non-transitory computer program product comprising a computer usable medium having computer readable program codes embodied in the medium that, when executed, cause a computer to execute:
extracting at least one text line from image data corresponding to an image that contains text;
measuring, with respect to each of directions in the image data, a degree of certainty that the direction corresponds to a predetermined direction of the image to obtain a first direction with highest degree of certainty and a second direction with second-highest degree of certainty; and
determining, when the first direction is opposite to the second direction, whether one of the first direction and the second direction corresponds to the predetermined direction based on a position of the text line; and
obtaining head coordinates and end coordinates of the text line, and
wherein the determining includes determining whether one of the first direction and the second direction corresponds to the predetermined direction based on the head coordinates and the end coordinates.

12. The non-transitory computer program product according to claim 11, wherein the determining includes determining whether the degree of certainty is equal to or larger than a threshold, and, when none of the degrees of certainty of all the directions is equal to or larger than the threshold with respect to all the directions, determining whether one of the first direction and the second direction corresponds to the predetermined direction.

13. The non-transitory computer program product according to claim 11, wherein the extracting includes extracting a plurality of text lines, the obtaining includes obtaining head coordinates and end coordinates of each of the text lines, and obtaining head-coordinate distribution and end-coordinate distribution, and the determining includes determining whether one of the first direction and the second direction corresponds to the predetermined direction based on the head-coordinate distribution and the end-coordinate distribution.

14. A non-transitory computer program product comprising a computer usable medium having computer readable program codes embodied in the medium that, when executed, cause a computer to execute:
extracting at least one text line from image data corresponding to an image that contains text;
measuring, with respect to each of directions in the image data, a degree of certainty that the direction corresponds to a predetermined direction of the image to obtain a first direction with highest degree of certainty and a second direction with second-highest degree of certainty; and
determining, when the first direction is opposite to the second direction, whether one of the first direction and the second direction corresponds to the predetermined direction based on a position of the text line; and
wherein the extracting includes extracting a rectangular area that includes a plurality of text lines from the image data,
the computer readable program codes further cause the computer to execute:
measuring first distances from a boundary of the rectangular area to heads of the text lines; and
measuring second distances from a boundary of the rectangular area to ends of the text lines, and
the determining includes determining whether one of the first direction and the second direction corresponds to the predetermined direction based on the first distances and the second distances.

15. The non-transitory computer program product according to claim 14, wherein the measuring first distances includes obtaining distribution of the first distances, the measuring second distances includes obtaining distribution of the second distances, and the determining includes determining whether one of the first direction and the second direction corresponds to the predetermined direction based on the distribution of the first distances and the distribution of the second distances.

* * * * *